(No Model.) 2 Sheets—Sheet 1.
W. DENGEL.
COMBINED HEATING AND COOKING STOVE.
No. 495,027. Patented Apr. 11, 1893.
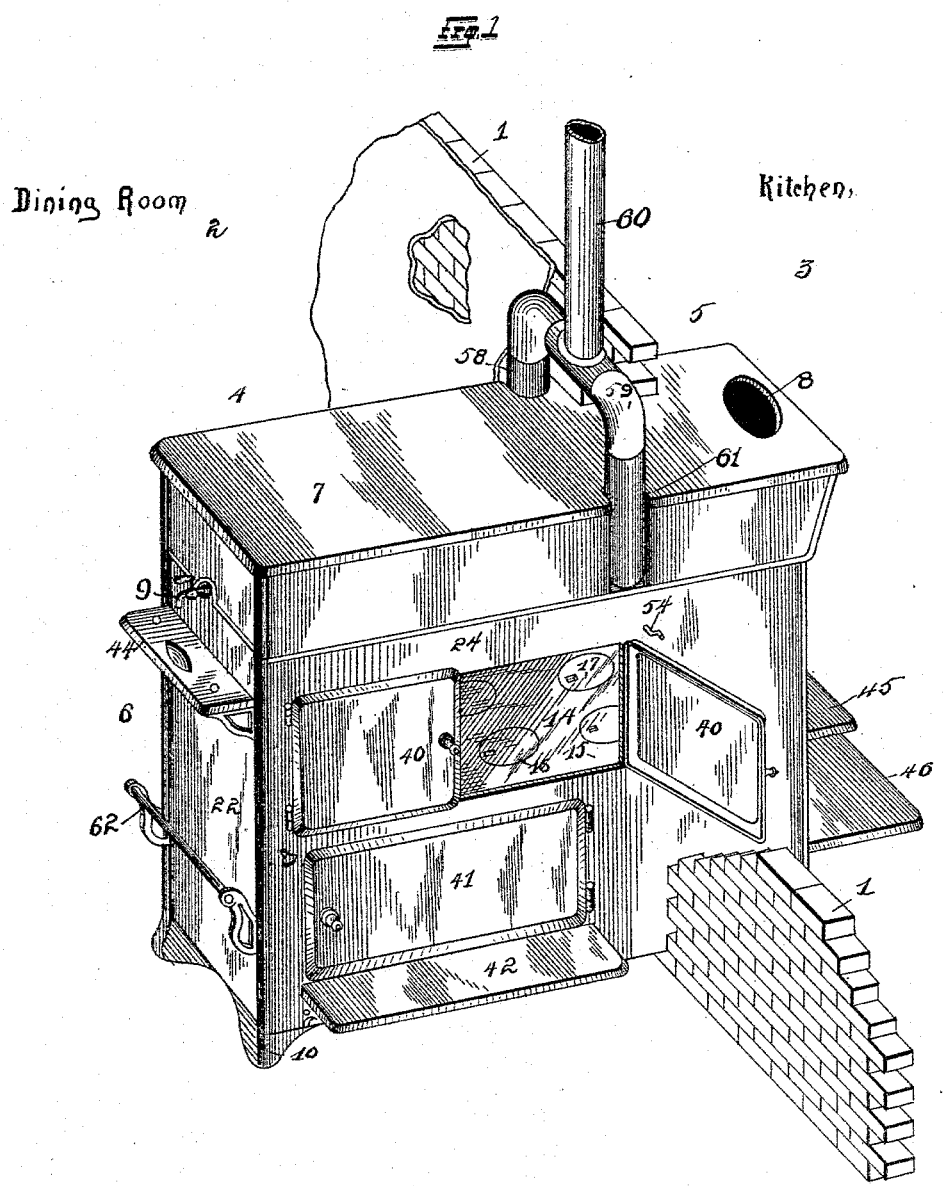
Witnesses
Alfred A. Eicks
Herbert S. Robinson
Inventor
William Dengel,
By his Attorneys Higdon Higdon & Longan (No Model.) 2 Sheets—Sheet 2.
W. DENGEL.
COMBINED HEATING AND COOKING STOVE.
No. 495,027. Patented Apr. 11, 1893.
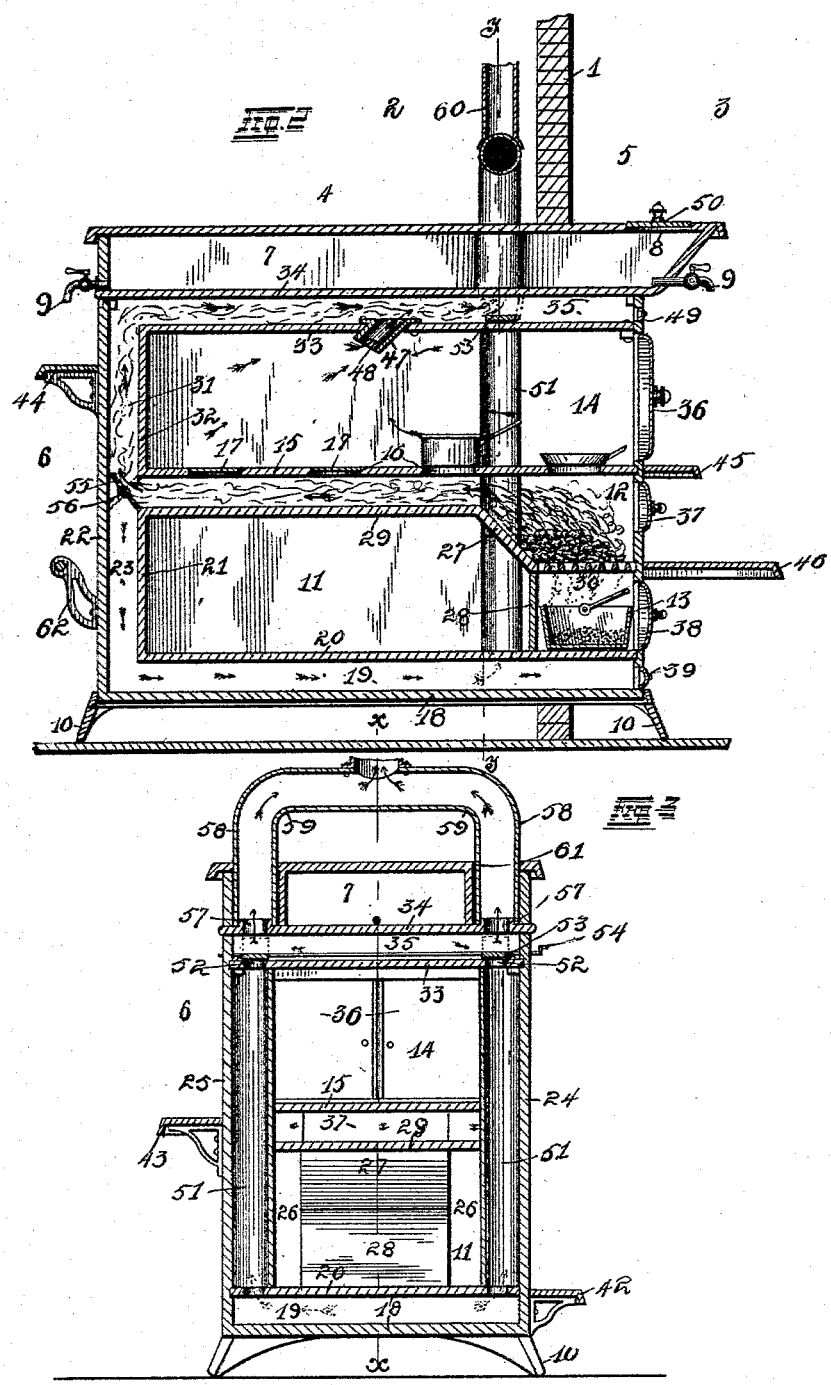
Witnesses
Alfred A. Eicks
Herbert S. Robinson
Inventor
William Dengel,
By his Attorneys Higdon & Higdon & Longan

UNITED STATES PATENT OFFICE.

WILLIAM DENGEL, OF SALINA, KANSAS.

COMBINED HEATING AND COOKING STOVE.

SPECIFICATION forming part of Letters Patent No. 495,027, dated April 11, 1893.

Application filed October 7, 1892. Serial No. 448,103. (No model.)

*To all whom it may concern:*

Be it known that I, WILLIAM DENGEL, of Salina, Saline county, State of Kansas, have invented certain new and useful Improvements in Combined Heating and Cooking Stoves, of which the following is a full, clear, and exact description, reference being had to the accompanying drawings, forming a part hereof.

My invention relates to improvements in "combined heating and cooking stoves," and consists in the novel construction and peculiar arrangement of the same in buildings, as will be more fully hereinafter described and set forth in the claims.

The object of my invention is to construct a stove designed for cooking and heating, the heating feature being attained in a more definite manner than is at present the case. Its peculiar location in a building wherein it is adapted to be placed, with parts of same in each of two rooms forms its principal features, together with its adaptability for operation in both rooms. It has the usual parts adapted for cooking, such as pan-holes, ovens, and so forth, together with a hot-water receptacle, all the above named parts being heated in an improved manner.

All of the work connected with the stove, such as attending to the fire, cleaning the soot out of the interior hot-air passages, the removal of ashes, and the placing therein of pans, &c., for the cooking of food, is done from that part of the stove which projects into the kitchen.

The portion of the stove which is located in the dining-room is especially adapted for the removal of the cooked foods ready for the table, the rewarming of different foods as desired, the warmth being imparted to the dining-room by the location of the stove therein, without any of the unpleasant features, such as steam and smoke being experienced.

In the drawings: Figure 1 is a perspective view of my complete invention, showing the division wall between two rooms broken away and through which projects a part of the stove from one room into the other. Fig. 2 is a vertical transverse sectional view taken on a line $x$ $x$ in Fig. 3. Fig. 3 is a horizontal cross sectional view taken on a line $y$ $y$ in Fig. 2.

Referring to the drawings: 1 indicates a division wall separating a dining-room 2 from a kitchen 3.

4 indicates the part of the stove located in the dining-room 2, and 5 represents the parts situated in the kitchen 3.

6 indicates the complete stove having a water tank 7 located above and on top of the same and in that portion of said tank which is located in the kitchen 3, is provided an opening 8 in the top of same, adapted for the removal of the water in the tank 7 by means of a dipper or cup.

9 indicates outlet faucets, one of which is located in each end of the tank 7, and near the bottom of same.

As will be seen in the illustrations, the larger portion of the stove is located in the dining-room 2.

The stove 6 is provided with feet 10 upon which it rests and by which it is elevated, and said stove is provided with an oven 11, firebox 12, ash chamber 13, and cooking-chamber 14 as will be more fully hereinafter described. The bottom 15 of the cooking-chamber 14 is provided with a number of pan-holes 16 with removable lids 17 therefor.

Immediately above the bottom-plate 18 of the stove 6, is a hot-air chamber 19 which extends the entire length and breadth of the stove. Immediately above the same is located the oven 11 and ash chamber 13, the bottom wall 20 of same acting as the top wall or plate for the hot-air chamber 19.

The ash chamber 13 is located in the end 5 of the stove 6 which is in the kitchen 3 and the oven 11 is of the same width as the stove 6, but has an end wall 21 located within the outside wall 22 of the stove, forming a hot-air chamber 23, leading from the hot-air chamber 19 upward, at right angles with the same, and extending the entire width of the stove.

The ash chamber 13 is of less width than the stove 6 and located intermediate of the two side walls 24 and 25, and which leaves portions 26 at each side of said ash chamber 13, for purposes more fully hereinafter set forth.

The ash chamber 13 is practically about half the height of the oven 11 and has an upwardly and inwardly inclined wall 27 which connects the inner end wall 28 of said chamber 13 with the top-plate 29 of the oven 11.

The fire-box 12 is located in the space above the ash chamber 13 and is separated from the same by a grate 30.

The bottom-plate 15 of the cooking chamber 14 is located some distance above the top wall 29 of the oven 11 and forms a hot-air chamber between the same, connecting at one end with a continuation 31 of the hot-air chamber 23 which is located between the end wall 32 of the cooking chamber 14 and the end 22 of the stove 6.

The top wall 33 is located below the bottom 34 of the tank 7 and forms a hot-air chamber 35 which connects with the hot-air chamber 31.

The cooking chamber 14 is provided with doors 36 in the end 5 of the stove, which is located in the kitchen 3. Also in the same end, are provided doors 37 for the fire-chamber 12, doors 38 for the ash-chamber 13 and doors 39 for the hot-air chamber 19, which admits of the insertion of proper implements therein, for the removing of soot and other accumulations therefrom.

Each of the side walls 24 and 25 are provided with doors 40 opening into the cooking-chamber 14 and doors 41 opening into the oven 11. A shelf 42 running longitudinally upon the side wall 24, is provided immediately below the oven door 41, and upon which baking-pans are adapted to be placed when it is desired to inspect the contents of same. A shelf 43 runs longitudinally along the side wall 25 immediately below the doors 40 to answer the same purpose as the shelf 42. A shelf 44 is provided upon the end wall 22 and immediately below the faucet 9, and upon which receptacles may be placed for filling with water from the faucet 9. A shelf 45 is located upon the end of the section 5 immediately below the cooking-chamber 14 and a shelf 46 below the fire-chamber door 37.

Depending from the top wall 33 and practically in the center of same, is a tubular projection 47 which has a center bore 48, and projects inwardly into the cooking-chamber 14 at an angle, and through which the steam generated in the pots and pans upon the pan-holes 16, is adapted to pass upwardly into the hot-air chamber 35.

A door 49 opens from the hot-air chamber 35 and through which implements may be inserted for the removal of accumulations.

A removable lid 50 is provided for the aperture 8 in the top plate of the tank 7.

Two vertical pipes 51 are located adjacent the side walls 24 and 25, and extend from the top wall 33 of the cooking-chamber 14 downwardly through the chamber 14, through its bottom wall 15, through the fire-box 12, the slanting wall 27 of the oven and through the bottom wall 20 of the oven 11. Thus it will be seen that said flues 51 connect the hot-air chambers 19 and 35. The apertures 52 in the wall 33 at points where said vertical pipes 51 join same, are adapted to be closed by traps or draft dampers 53 both of which are operated by a damper rod 54.

A damper 55 operative upon a rod 56 runs the entire width of the stove at a point where the hot-air chamber located between the oven 11 and cooking-chamber 14 merges into and joins the hot-air passages 23 and 31.

As before stated, the bottom wall 34 of the tank 7 serves as the top of the stove and as the top of the hot-air chamber 35 and at a point in alignment with the aperture 52, is provided with apertures 57 from which extend upwardly pipes 58, which are provided with elbows 59, said pipes joining and merging into an upright pipe 60.

In order that the pipes 58 will not extend outwardly beyond the sides of the tank 7, I have provided depressions 61 in the sides of said tank through which the pipes 58 project, and this construction is also made use of in order that the pipes 51 and 58 may be opposite each other, in order to insure a perfect draft.

A foot-rest 62 is provided upon the end wall 22.

In the manufacture of the above described stoves, the usual linings, grate-bars, ash-pans, and so forth-are made use of.

The operation is as follows: It will readily be seen that superior advantages in the way of heating all the parts of the stove are gained by the improved construction hereinbefore described, which sets forth an additional number of hot-air chambers, so located that their functional operation furnishes improved heating facilities. As before stated, the work connected with the care and operation of the stove is in the main part done in the portion 5 of the stove which is located in the kitchen 3. As the food is prepared in the kitchen, ready for being placed in the stove, the doors 36 are provided in order that the different pots and pans may be placed upon the pan-holes 16 in the cooking-chamber 14. The shelves 42, 43, 45 and 46 are located respectively below certain apertures in the stove and upon which the foods may be placed for inspection during the process of cooking.

The main feature of the location of this stove with the larger portion in the dining-room, is in order that the foods when cooked may be removed from the culinary receptacles and placed directly upon the table located in the dining-room. The empty pans may then be placed in the cooking-chamber 14 and taken out through the doors 36 in the kitchen portion 5 of the stove.

The improved facilities for heating the different parts of the stove are very important as by the use of certain constructions, I am enabled to thoroughly heat every part of the stove, either all at one time or parts of same at a time.

It will be seen that if the damper 55 is inclined from the oven 11 to the wall 22, and the dampers 53 over the aperture 52 closed, the heat from the fire-chamber 12 passes through the hot-air chamber between the top of the over 11 and the cooking-chamber 14, upward through the hot-air chamber 31 at the end of said hot-air chamber 14 and through the hot-air chamber 35 under the tank 7, to the flues 58. If, however, the damper 55 is turned to the position as shown in dotted lines in Fig. 2 with the damper inclined from the bottom of the chamber 14 to the wall 22 and the damper 53 is up and open, the hot air and heat affects the bottom plate 15 of the cooking chamber 14, and the top of the oven 11, said heat passing downwardly through the chamber 23 heating the end of said oven 11 and through the hot-air chamber 19 heating the bottom of said oven and thence upwardly into the flues 51 and pipes 58. It will readily be seen that this oven is especially heated in an improved manner, but the heat is applied to same from four sides.

The different parts of the stove are especially designed with a view of simplicity in operation and construction, at the same time affording improved facilities for heating.

The above described stove need not necessarily be located in two rooms as herein described, but if desired, could be used in a kitchen alone, although its heating qualifications make it especially commendable for the purposes herein described.

The object of the depending projection 47 provided with a central bore 48 is to allow all steam and odor to escape through the same into the flues instead of going out into the room when the door is open.

I have found by practical experiments that the soot and accumulations in the chamber 35 will not enter the cooking-chamber 14, as might be supposed by looking at the illustrations. This action is prevented by the current of air which is continually passing through the said chamber 35 and which has a tendency to prevent the movement of the soot or accumulations.

Having fully described my invention, what I claim is—

1. An improved combination heating and cooking stove having a cooking-chamber, operative from two separate rooms, said cooking-chamber having a number of sides exposed to heat, a bottom-plate 15 to said chamber 14, said bottom 15 provided with a number of pan-holes 16 and removable lids 17 therefor, and inclined depending projection 47 from the top wall 33 of said cooking-chamber 14, said projection provided with a center bore 48, and the steam and odor generated in said cooking-chamber adapted to pass through said opening 47 into the hot air chamber 35, substantially as set forth.

2. An improved combination heating and cooking stove having a lower hot-air passage 19 between the bottom wall 20 of said oven 11 and the bottom 18 of said stove 6, a hot-air chamber 23 connecting said chamber 19 with a hot-air chamber 31, said chambers 23 and 31 connected with a hot-air chamber between the top wall 29 of said oven 11 and the bottom wall 15 of said chamber 14, and said hot-air chamber 31 merging into a hot-air chamber 35 at the top of the stove, said chamber surrounding a number of sides of said oven 11 and cooking chamber 14, substantially as set forth.

3. An improved combination heating and cooking stove having upright vertical pipes 51 leading through the oven 11, fire-box 12 and chamber 14, a damper 53 adapted to be operative over each of said pipes 51, a damper 55, operated by a rod 56, pipes 58 leading from said pipes 51 and merging into a chimney pipe 60, substantially as set forth.

4. An improved combination heating and cooking stove having a tank 7, provided with faucets 9, adapted to be operative in two separate rooms, doors 36 opening into one room from said cooking-chamber 14, doors 37 and 38 opening from said fire-chamber 12 and ashes chamber 13 into one room, doors 40 adapted to open from said chamber 14 into a separate room, doors 41 adapted to open from said oven 11 into a separate room, shelves 42 under said doors 41, shelves 43 under said doors 40, and a shelf 44 under one of said faucets 9, substantially as set forth.

In testimony whereof I affix my signature in presence of two witnesses.

WILLIAM DENGEL.

Witnesses:
HERBERT S. ROBINSON,
ALFRED A. EICKS.